United States Patent

[11] 3,558,802

| [72] | Inventors | William A. Stein<br>Palos Verdes Peninsula;<br>Robert J. Cirillo, Torrance, Calif. |
|---|---|---|
| [21] | Appl. No. | 695,653 |
| [22] | Filed | Jan. 4, 1968 |
| [45] | Patented | Jan. 26, 1971 |
| [73] | Assignee | The National Cash Register Company<br>Dayton, Ohio<br>a corporation of Maryland |

[54] FIXABLE PHOTOCHROMIC DISPLAY APPARATUS
11 Claims, 8 Drawing Figs.

[52] U.S. Cl. .................................................. 178/15,
178/6.7; 340/173, 340/324; 355/20
[51] Int. Cl. ...................................................... G11b 7/28,
G03b 27/32
[50] Field of Search ................................................ 178/6.7;
178/15; 178/5.4; 95/14; 96/90, 90PC, 48, 49;
355/1, 14, 20; 340/173CSS, 173LM, 324.1

[56] References Cited
UNITED STATES PATENTS

| 2,727,446 | 12/1955 | Tuttle ........................... | 95/14 |
| 3,258,525 | 6/1966 | Piatt et al ..................... | 178/5.4 |
| 3,355,293 | 11/1967 | Foris ............................. | 96/90 |
| 3,359,103 | 12/1967 | Becker et al .................. | 96/90 |
| 3,434,158 | 3/1969 | Stauffer et al. ............... | 178/6.7 |

Primary Examiner—Bernard Konick
Assistant Examiner—Steven B. Pokotilow
Attorneys—Louis A. Kline and Joseph R. Dwyer ABSTRACT: An apparatus adapted to receive a filmstrip having a coating of a saccharin-containing photochromic material, includes a central chamber wherein a cathode ray tube imaging means produces reversably opaque image areas on the normally transparent filmstrip. Means are provided to expose the filmstrip to sulfur dioxide gas which affects the photochromic material to render the entire exposed portion of the filmstrip opaque. Means are provided to evacuate the gas and to apply heat which reverses the effect of the gas in those areas that were transparent at the time of exposure. The image areas that were temporarily rendered opaque by the cathode ray tube imaging means remain permanently fixed. The apparatus has a filmstrip inlet chamber and film strip outlet chamber connected to vacuum exhaust system. Leakage of the sulfur dioxide gas from the central chamber is drawn out of the apparatus through the exhaust system before it can escape into the atmosphere.

INVENTORS
WILLIAM A. STEIN
ROBERT J. CIRILLO

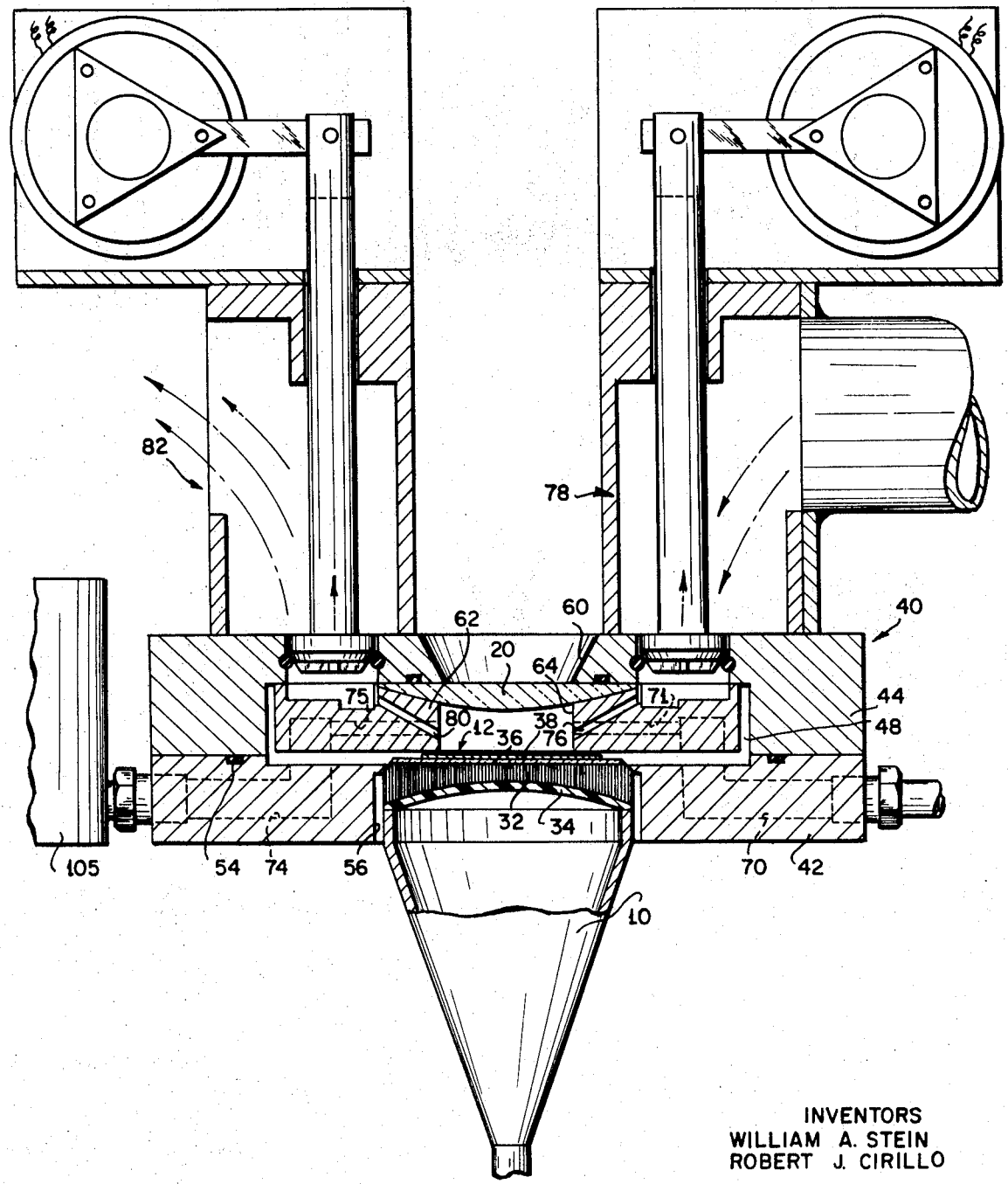

INVENTORS
WILLIAM A. STEIN
ROBERT J. CIRILLO

BY *Louis A. Kline*
*John J. Matlago*
*Robert L. Farrington*
THEIR ATTORNEYS

FIXABLE PHOTOCHROMIC DISPLAY APPARATUS

BACKGROUND OF INVENTION

This invention is directed to a real-time display system. A system such as contemplated herein has a number of uses, an example of which is for tracking the pattern of air traffic located in a designated vicinity. A typical example of such a system can include radar and other detecting equipment that feeds coded information to a computer. The computer calculates information such as location, speed, etc., of the various aircraft that are detected and sends electronic signals to a cathode ray tube unit which instantly converts the electronic signals to visible information that is displayed on the face plate of the cathode ray tube. Such information is thus displayed to the viewer almost at the instant of its occurrence, i.e., it is a real-time display.

Whereas cathode ray tubes are well known for their ability to convert electronic signals to visible images, it has been only quite recently that practical means have become available for projecting the images from the face plate of the cathode ray tube onto a large size display screen where an audience of people can easily observe the information. One such system is disclosed in the commonly assigned application of Bjelland, Ser. No. 347,181, filed Feb. 25, 1964, now Pat. No. 3,519,742, and Jones, et al., Ser. No. 622,203, filed March 10, 1967 now Pat. No. 3,522,367. In these systems, a photochromic film is placed over the face plate of a cathode ray tube in which ultraviolet light emitting phosphor is coated on the inner surface. When struck by the cathode ray tube's electron beam, the phosphor emits ultraviolet light rays through the face plate and into the photochromic film. The normal transparent film turns opaque in those areas, thereby forming the desired image. A dichroic filter that transfers ultraviolet light, but specularly reflects visible light, is located between the photochromic film and the face plate. A visible light is directed onto the face plate. A visible light is directed onto the face plate. The light passes through the transparent portion of the photochromic film and is reflected by the dichroic filter back through the film where a projection system projects the light beam onto a large size display screen. The opaque image of the photochromic film, having blocked out corresponding portions of the light beam, is thus reproduced on the screen.

The described system is satisfactory for the normally desired operation of the display. The photochromic film retains the opaque image only a short period of time, thereby permitting updated information to be continuously displayed on the screen. However, it is desirable on occasion to make a permanent record of an item of information that appears on the screen and the reversible characteristic of the photochromic film, where the opaque areas revert back to their transparent state, is unable to provide this. It is therefore an object of this invention to provide an apparatus having the advantages of the above-described system using a photochromic film as a recording medium from which an image recorded thereon is projected onto a large size display screen, with the added advantage whereby a means is provided for selectively fixing certain of the images. Although not applied to the art of display systems, a process of fixing images for general reference can be found in the commonly assigned U.S. Pat. No. 3,359,103 issued in the name of Becker, et al., on Dec. 19, 1967.

BRIEF SUMMARY OF INVENTION

In general, the preferred apparatus of the invention includes an image-fixing assembly having a central chamber that is adapted to receive a cathode ray tube so that the bottom wall of the central chamber is at least partially provided by the face plate of the cathode ray tube. Means are provided to pass a saccharin-containing photochromic film strip through the fixing assembly so that a portion of the filmstrip can be positioned in intimate contact on the face plate. A gas inlet is provided to introducing sulfur dioxide gas (sometimes referred to hereafter as $SO_2$ gas) into the chamber to thereby expose the image area of the filmstrip, and a heating means is provided to heat the filmstrip following the exposure. Secondary chambers including inlet and outlet chambers are provided at either side of the central chamber along the film passageway. Said inlet and outlet chambers are connected to a vacuum exhaust system to exhaust the $SO_2$ gas leaking out of the central chamber to avoid escape of the toxic and highly obnoxious gas fumes into the surrounding atmosphere.

These and other advantages will become apparent upon reference to the following detailed descriptions and drawings wherein:

FIG. 3 is a sectional view of the apparatus taken on line 3–3 of FIG. 1;

Figure 1:
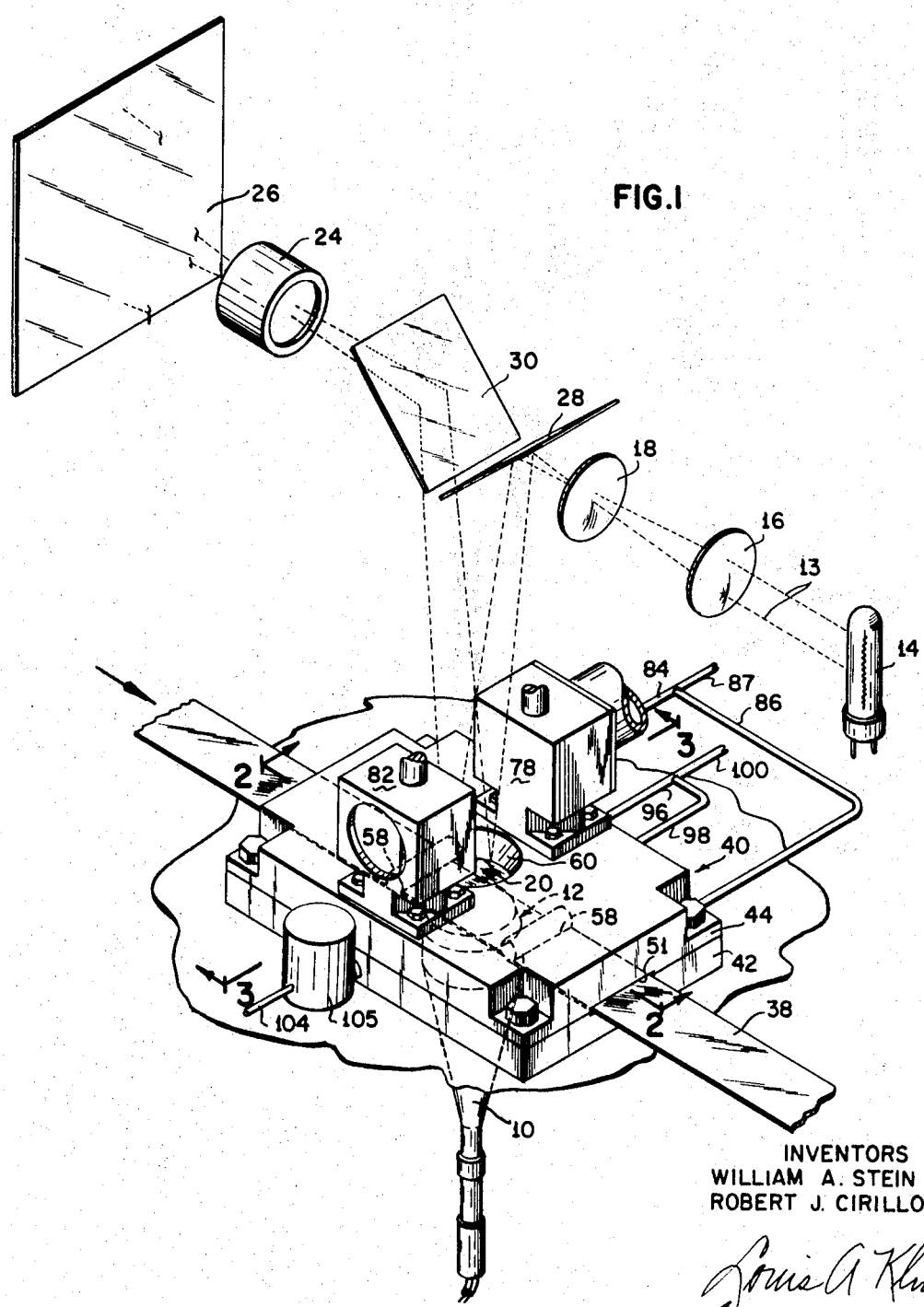
FIG. 1 is a perspective view illustrating one embodiment of the invention as incorporated into a large screen display system.

Referring to FIG. 1 of the drawings, the illustrated display system includes a cathode ray tube 10 adapted to produce a desired image on its face plate 12. A light beam 13 of a light source 14 is directed by a lens system, including a condensing lens 16 and a relay lens 18, onto the face plate 12 of the cathode ray tube 10. The face plate 12 is adapted to specularly reflect the image-bearing light beam 13 through a field lens 20 onto a projection lens 24 that projects the light onto a large display screen 26. Folding mirrors 28 and 30 are provided to enable projection of the image off the horizontally oriented face plate onto the vertically oriented display screen.

Figure 2:
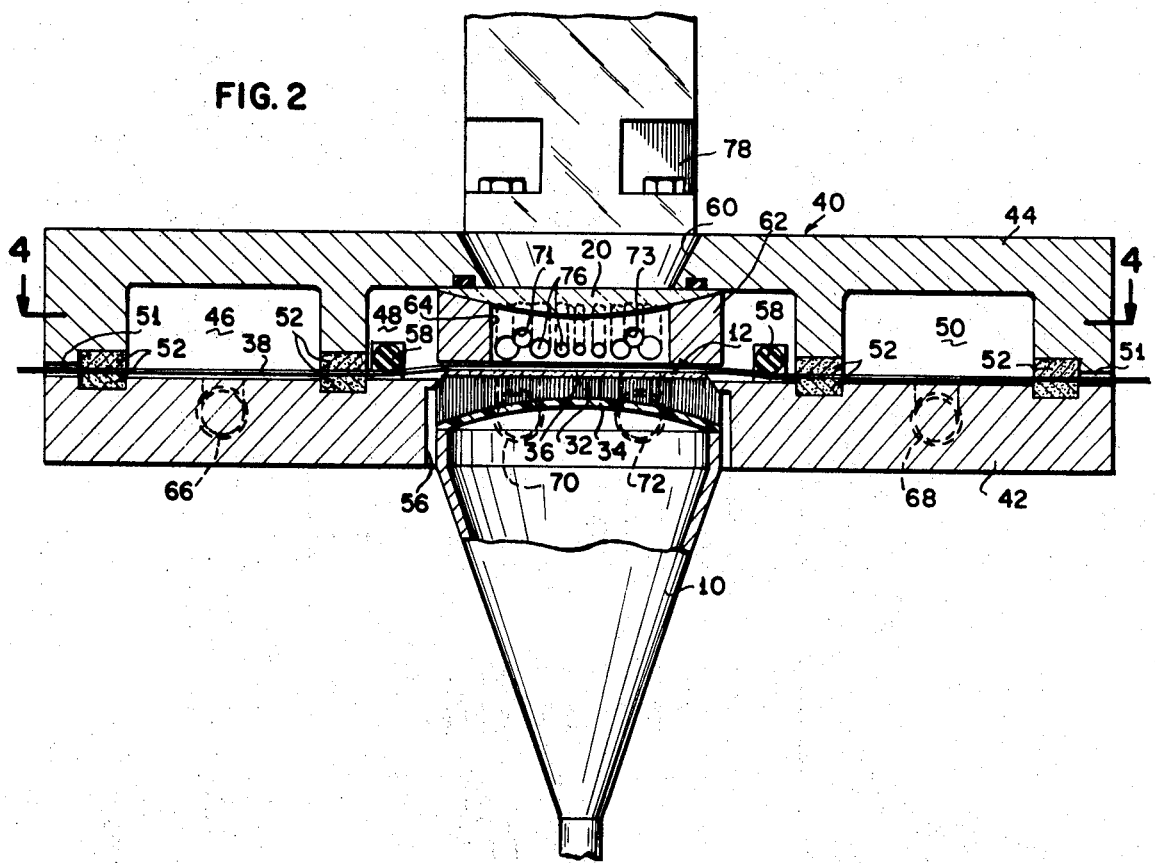
FIG. 2 is a sectional view of the apparatus of the invention taken on line 2–2 of FIG. 1.

The construction for the face plate 12 is more clearly illustrated in FIGS. 2 and 3 of the drawings. The core of the face plate 12 is comprised of a fiber optic plate 32 having a flat outer surface and a spherical concave inner surface. A phosphor 34 having the property of emitting ultraviolet light when bombarded by the electron beam of the cathode ray tube, is coated on the inner surface of the fiber optic plate. A dichroic filter 36 having the property of transmitting ultraviolet light and specularly reflecting visible light is applied adjacent to the flat outer surface of the fiber optic plate 32. In the areas where the electron beam of the cathode ray tube bombards the phosphor coating 34 (e.g., in accordance with signals provided to the electronics of the cathode ray tube from a central control which is not shown) ultraviolet light is emitted which is transmitted by the light fibers of the fiber optic plate 32 and by the dichroic filter 36 onto a photochromic filmstrip 38 provided over the face plate adjacent to the dichroic filter. The photochromic material of the filmstrip is sensitive to ultraviolet light and changes from a transparent state to an opaque state in those areas that are struck by he ultraviolet light. The light beam 13 (visible light) that is directed onto the cathode ray tube face plate 12 from light source 14, passes through the transparent portions of the photochromic film 38 to be reflected by the dichroic filter 36 back through the same transparent portions of the photochromic film toward the projection lens 24. The images created on the photochromic film by the discriminate bombardment of the electron beam is reproduced on the display screen 26. Many of the details of the system generally described above are more specifically described in the above-mentioned copending application of Jones, et al., Ser. No. 622,203.

The improvement of the present invention is primarily embodied in the means for converting the image that is temporarily produced in the photochromic material of the filmstrip 38 to a permanent state. This conversion is achieved in the fixing assembly 40 schematically shown in FIG. 1 and in detail in the sectional views of FIGS. 2, 3 and 4.

Figure 4:
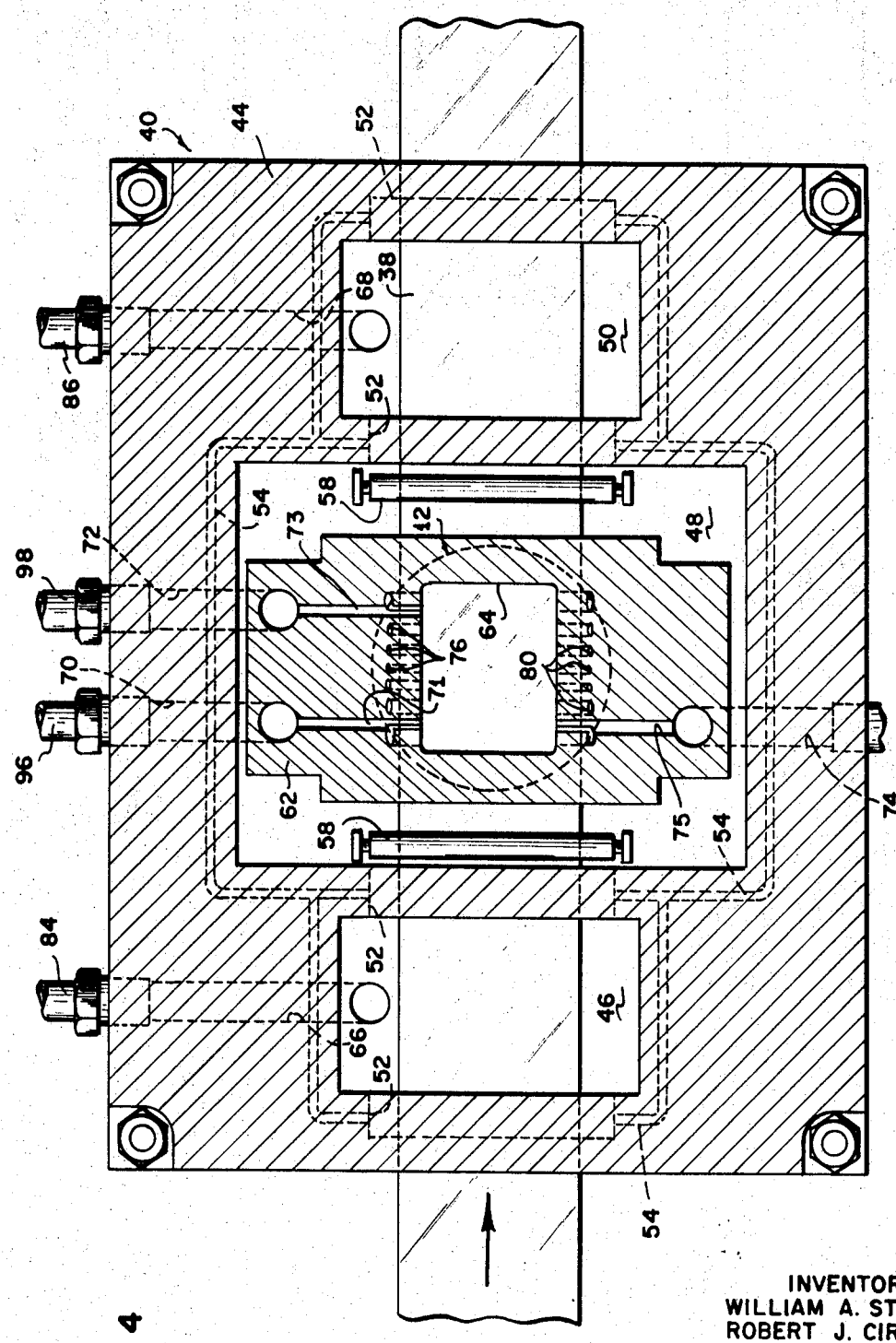
FIG. 4 is a sectional plan view of the apparatus taken on line 4–4 of FIG. 2.

The fixing assembly 40 has a lower section 42 and an upper section 44. These two sections mate to form an inlet chamber 46, a central chamber 48 and an outlet chamber 50. As shown in FIGS. 2 and 4, a pathway is provided into and through the chambers for the film strip 38, i.e., recesses 51 are provided in the mating flanges (see FIGS. 1 and 2). Felt seals 52 (see FIGS. 2 and 4) are provided in the flanges of the recess portions to impede gas flow between the chambers and to the atmosphere through the passageway while permitting slippage of the filmstrip 38 therethrough. Grooves provided with O ring segments 54 (see FIGS. 3 and 4) effect a gas tight seal between the sections 42 and 44 around the chambers at all points except those portions defining the passageway where the felt seals 52 are provided.

An opening 56 is provided in the lower section 42, centrally positioned with respect to the central chamber 48 (see FIGS. 2 and 3). This opening 56 is adapted to receive the cathode ray tube 10 so that the flat outer surface of the face plate 12 is slightly raised above the bottom surface of the central chamber 48. Thus a filmstrip 38 positioned in the passageway through the chambers lies over the face plate 12. Pressure rollers 58 on each side of the face plate ensure a continuous intimate contact of the filmstrip to the face plate.

An opening 60 is provided in the upper section 44 directly over the face plate 12 of the cathode ray tube. The field lens 20 is affixed under the opening 60 and is held in place by a holding member 62 that is attached to the upper section. The holding member 62 extends downwardly into the central chamber to a point just above the face plate 12. An opening in the holding member 62 defines an inner central chamber 64.

As most clearly seen in FIG. 4, vacuum ports 66 and 68 are provided through the lower section 42 into the inlet chamber 46 and outlet chamber 50, respectively. Vacuum ports 70 and 72 are provided through the lower section 42 into the central chamber 48 and interconnect with vacuum ports 71 and 73 formed through the holding member 62 into the inner central chamber 64. A gas inlet port 74 is also provided in the lower section 42 into the central chamber 48 and continues through gas inlet port 75 in the holding member 62 to the inner central chamber 64.

A plurality of apertures 76 (see FIGS. 3 and 4) are provided in the holding member 62 along one side of the inner central chamber. The apertures 76 are angularly disposed for directing hot air from a hot air inlet valve 78 onto the portion of the photochromic filmstrip positioned over the cathode ray tube face plate 12. A second set of apertures 80 are provided in the holding member 62 along the other side of the inner central chamber. The apertures 80 are also angularly disposed for directing the hot air away from the photochromic filmstrip into a hot air outlet valve 82. The apertures 76 and 80 are arranged to provide an even flow of the hot air over the surface area of the filmstrip.

FILM CONSTRUCTION

A filmstrip 38 suitable for use in the apparatus disclosed herein is described in the following:

A coating solution is prepared consisting of

|  | Percent |
|---|---|
| Acryloid B-72 | 20.00 |
| Toluene | 73.80 |
| Diphenyl Guanidine (DAG) | 00.14 |
| N-ethyl saccharin | 02.06 |
| Photochromic dye | 04.00 |

A suitable photochromic dye is a Benzospyropyran-type photochromic dye, e.g., N.C.R. Photochromic Dye No. 135 available from The National Cash Register Company.

The above solution was coated onto a film substrate of polyethylene terephthalate, e.g., optical quality type D Mylar available from the Du Pont de Nemours Company. A smooth uniform coating is applied to the substrate as for example by the process disclosed in the commonly assigned application, Ser. No. 646,955, now abandoned titled Process and Apparatus for Coating Thin Film Substrates, filed Jun. 19, 1967, in the names of Michael A. Flavin, et al.

The thickness of the film substrate is preferably in the order of 1 mil, whereas the dried coating applied thereon, i.e., with the toluene evaporated therefrom, is preferably about 4 microns. The above thicknesses are desirable in the operation of the disclosed apparatus where the uncoated side of the film is placed against the face plate of the cathode ray tube. Whereas with this arrangement, the exposure of the photochromic coating to the ultraviolet light is somewhat impeded by the Mylar substrate; maximum exposure of the coating to the $SO_2$ gas is provided. It will be understood, however, that variations of the film thickness are possible. For example, the use of a substrate that is highly pervious to $SO_2$ gas would permit reversal of the film position. A higher UV writing rate would be obtained, i.e., the ultraviolet light would not have to penetrate the substrate, while the pervious substrate would enable satisfactory penetration of the $SO_2$ gas into the coating to achieve the desired fixation of the image.

Various other changes may be made to adapt the film to the different applications contemplated for the invention. Thus, for example in the above described preferred application for the apparatus, the film construction includes diphenyl guanidine to enhance chemical stability of the coating. This resulted in a noticeable reduction in the discoloration of the background portions of the film, a condition which was observed after repeated usage of previous film compositions.

OPERATION

Figure 5A:
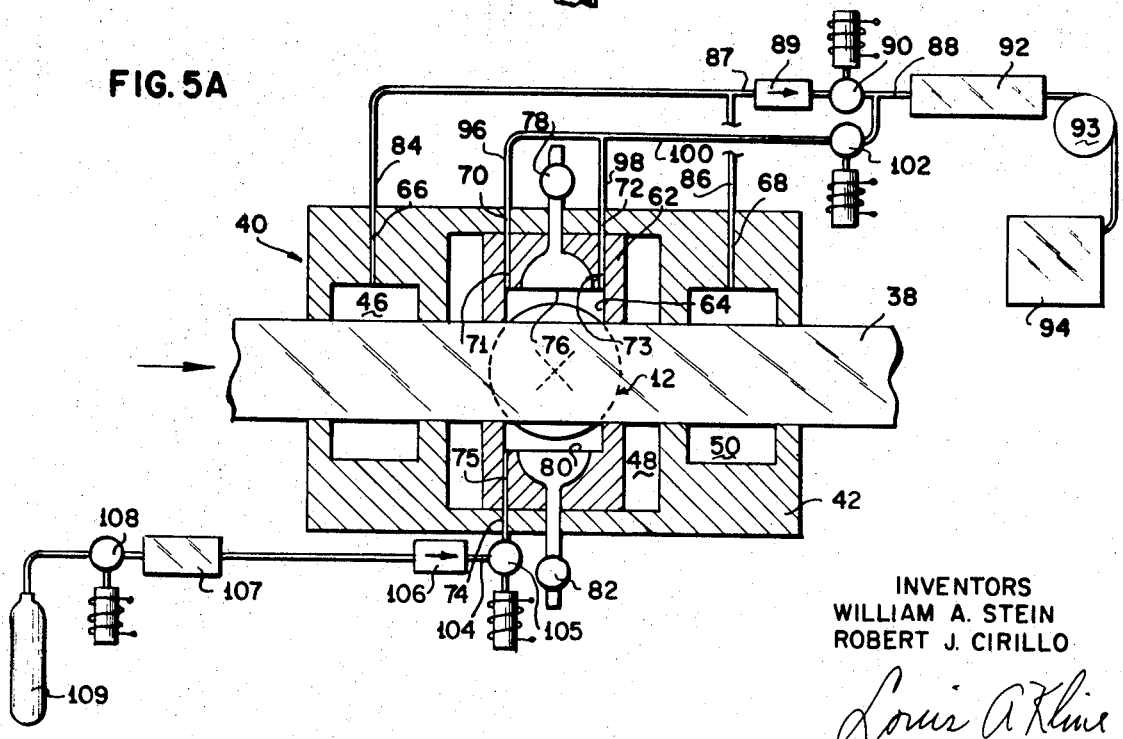
FIGS. 5A, 5B and 5C are schematic illustrations of the apparatus indicating the step-by-step process incorporated in the operation of the apparatus.
Figure 5B:
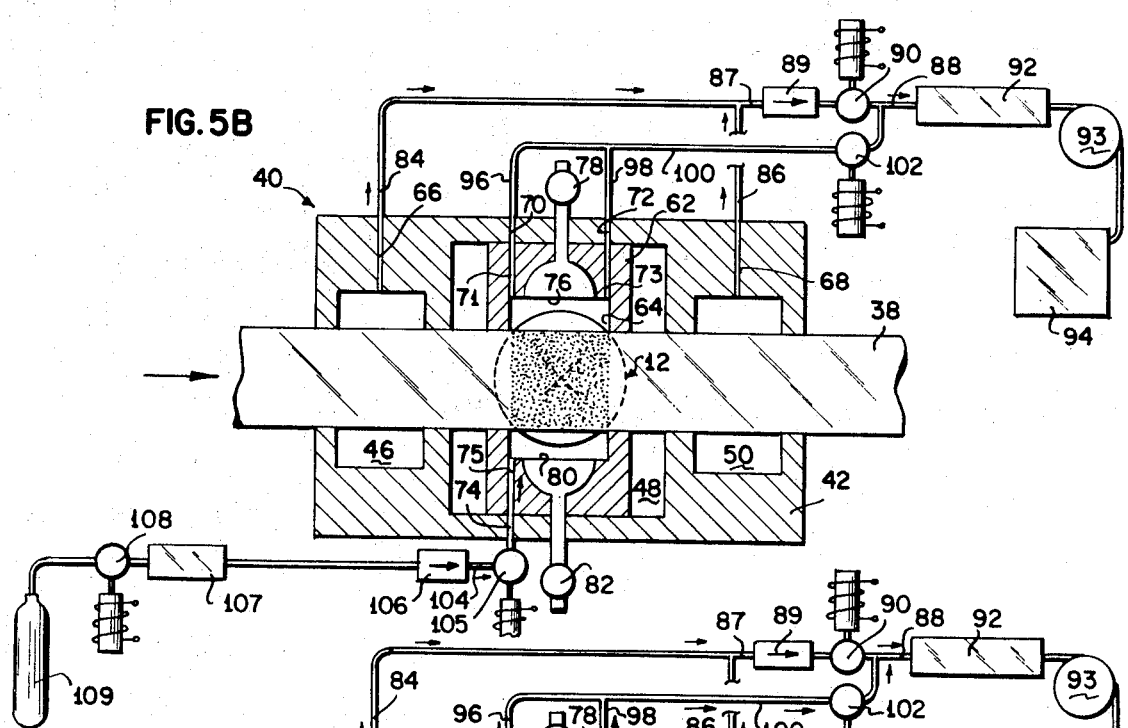
Figure 5C:
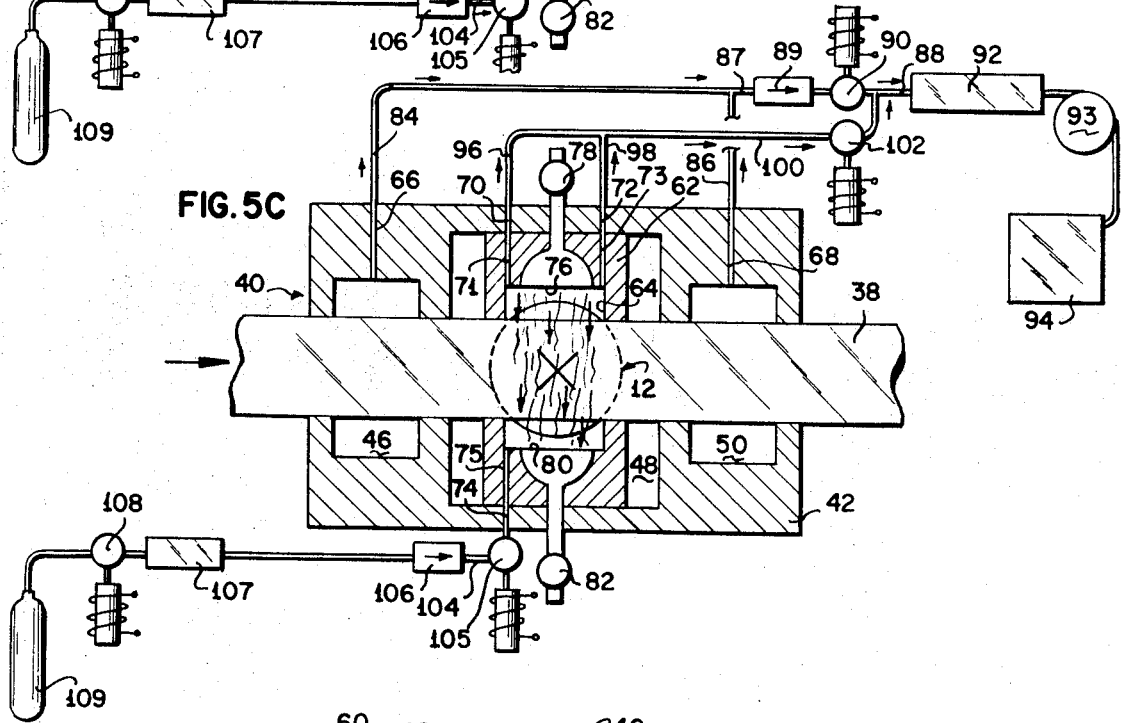

Referring to FIGS. 5A, 5B and 5C, it will be seen that the inlet and outlet chambers 46 and 50 are provided with vacuum ports 66 and 68 connected to tube sections 84 and 86, respectively. Tube sections 84 and 86 are joined together to form tube 87 which is controlled by flow control valve 89 and a solenoid operated shut off valve 90. The tube 87 is then connected to a main vacuum conduit 88 that passes through a sulfur dioxide gas absorber 92. A vacuum pump 93 is connected to the main vacuum conduit 88 which then is exhausted through a water filter 94 and into the atmosphere.

The vacuum ports 70 and 72 for the central chamber 48 are connected to tube sections 96 and 98, respectively, which are joined together to form tube section 100. Tube section 100 is controlled by a solenoid operated shutoff valve 102 and is connected to the main vacuum conduit 88.

The gas inlet port 74 is connected to tube 104 which connects through a solenoid operated shutoff valve 105 and a flow control valve 106 to a gas measuring tank 107 which receives, through another solenoid operated shutoff valve 108, a sulfur dioxide gas from a source 109.

In the operation of the above-described apparatus, and with specific reference to the schematic views of FIGS. 5A, 5B and 5C, the filmstrip 38 is first positioned to place a portion of the filmstrip over the face plate 12 of the cathode ray tube 10. The photochromic film is imaged in accordance with the teachings of the previously mentioned copending commonly assigned applications of Bjelland and Jones, et al. Thus, the electron beam of the cathode ray tube 10 is directed onto the phosphor coating 34 of the face plate 12 in accordance with the commands of a central control such as a computer or the like. Ultraviolet light is emitted by the phosphor in those areas struck by the electron beam, through the fiber optic plate 32, through the dichroic filter 36 and onto the photochromic film 38. The photochromic material which is normally transparent absorbs the ultraviolet light and is rendered opaque in those areas struck by the ultraviolet light. The resulting image is represented in FIG. 5A by an X.

Assuming that the image formed in the film represents information that is to be permanently recorded, the operator of the equipment initiates the fixing cycle that comprises the following steps:

Step 1. Valve 90 is opened whereby the vacuum pump 93 draws a vacuum through tubes 84 and 86 to create a negative pressure in the inlet and outlet chambers 46 and 50; and valve 108 is opened to fill the measuring tank 107 with a determined quantity of $SO_2$ gas.

Step 2. Valve 108 is closed and valve 105 is opened and as indicated by the arrows of FIG. 5B, the gas in measuring tank 107 is passed into the central chamber 48 for exposing the photochromic film. The felt seals 52 permit considerable leakage of the gas (this leakage aids in drawing the gas out of the measuring tank 107) and the gas is drawn out of the central chamber 48 through the inlet and outlet chambers 46 and 50 where it is exhausted through tubes 84 and 86.

Step 3. Valve 106 is closed and during a time delay of about 6 seconds, the photochromic film is exposed to the gas as it is being drawn out of the central chamber 48. (Optimum exposure is, however, determined by the setting of flow control valves 89 and 106.) The entire coating on the film becomes opaque as indicated in FIG. 5B. It is believed that the change is a result of a reaction that the saccharin of the photochromic coating has to the $SO_2$ gas.

Step 4. Valve 102 is opened to provide a direct vacuum to the central chamber 48, thus essentially evacuating all of the gas from this chamber.

Step 5. Hot air inlet valve 78 and outlet valve 82 are opened and hot air is directed in an even pattern through the apertures 76 across the exposed portion of the film, as noted in FIG. 5C. This heat treatment is maintained about 15 seconds and has the effect of reversing the reaction to the saccharin and returning the film to its transparent state, except in the areas wherein the photochromic film had been temporarily imaged by ultraviolet exposure of the film. In those areas, the coating is permanently opaque and can be stored for long periods of time and retrieved when desired by projecting it onto the display screen in the same manner as described heretofore. It has been found that the described reversing action occurs when the temperature of the photochromic film is raised to about 70° C. Due to heat loss in the heating process, the temperature of the hot air is much greater than 70° C., e.g., in excess of 100° C.

During the above five-step procedure, the light projection system is turned off. It has been found that while the photochromic coating on the film is in the reacted state of being entirely opaque, light exposure thereof will cause that state to become permanent.

Figure 6:
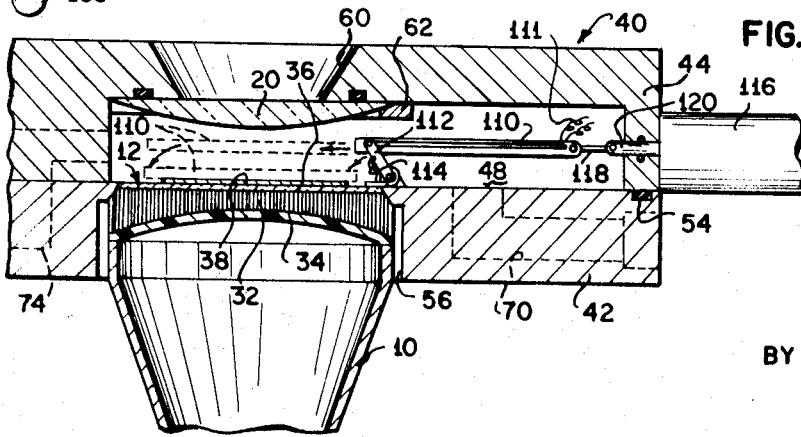
FIG. 6 is a sectional view similar to FIG. 3 showing an alternative embodiment of the invention.

An alternate embodiment of the present invention is illustrated in FIG. 6. This FIG. is similar to FIG. 3 illustrating the first embodiment of the invention. However, rather than providing apertures for directing hot air onto the exposed film, the alternate embodiment provides means whereby a heating plate 110, electrically heated through wires III to a temperature of about 75° C., is adapted to be positioned in direct contact with the film.

As illustrated in FIG. 6, the heating plate 110 is slidably connected to one end of a lever 112 which has its other end pivotably connected within the central chamber 48 adjacent to the cathode ray tube face plate 12. A coil spring 114 engaging the lever 112 provides a biasing force to urge the lever into the upper position shown in FIG. 6.

A solenoid 116 is connected to the heating plate to locate the heating plate between a retracted position shown in solid lines and an extended position shown in dotted lines in FIG. 6.

A linkage bar 118 interconnects the heating plate with the solenoid rod 120. This linkage bar in cooperation with lever 112 operates to position the heating plate from its retracted position to a position shown in dotted lines in FIG. 6, where the heating plate reaches its maximum point of extension with respect to the sliding connection of the heating plate to the lever. An additional movement of the solenoid rod causes pivoting of the plate on the lever 112 and the linkage bar 118 to move the plate down onto the film also shown in dotted lines in FIG. 6. Whereas direct contact is obtained, it may be desirable to coat the contacting surface of the plate with a nonsticking material such as Teflon antiadhesive material also available from Du Pont de Nemours Company.

The alternate embodiment is believed to have the advantage of reducing the heating time as well as the cooling time of the fixing process. It will be understood that various other omissions, substitutions and changes in the form and details of the apparatus illustrated and in the operation thereof may be made by those skilled in the art, without departing from the scope and spirit of the invention. It is the intention, therefore, to be limited only as indicated by the following claims.

We claim:

1. A real time large screen display system comprising a cathode ray tube with a face plate including a fiber optic plate, a phosphor material coated on the inner surface of the fiber optic plate which emits ultraviolet light when bombarded by the electron beam of the cathode ray tube, and a dichroic filter that transfers ultraviolet light and specularly reflects visible light positioned adjacent the outer surface of the fiber optic plate, a photochromic film over the dichroic filter which reacts to the ultraviolet light to form temporary opaque image areas therein, light-directing means to reflect a visible light beam off the face plate and into a projection system for projecting the resulting image-bearing light beam onto a large size screen, a chamber enclosing the face plate, means for passing said photochromic film through said chamber, means for applying a gaseous fixing agent to said photochromic film in said chamber, and means for heating said photochromic film for permanently fixing the temporary image areas that are formed on the photochromic film.

2. An apparatus for fixing temporary opaque images produced on a transparency that is used in a large screen real-time display system, the transparency being a transparent film coated with a normally transparent photochromic material which is reactive to ultraviolet light exposure to form the temporary image areas, and which is further reactive to certain gas exposure whereby the temporary image areas are fixed, said apparatus comprising: an image-fixing assembly having a central chamber, said assembly having a passageway to allow the film to be drawn through the central chamber, means for directing ultraviolet light rays onto the film in a discriminate pattern to form a desired temporary opaque image area thereon, gas injection means to inject a gas into the central chamber which reacts with the photochromic material to render the entire portion of the film within the central chamber opaque, exhaust means to exhaust the gas from the central chamber, and heating means for heating the film to reverse the gas induced reaction in the nonimage areas with the image areas being permanently opaque.

3. In a real-time display system wherein images temporarily produced on a photochromic film are light projected onto a large size display screen, an apparatus for converting the temporary image to a permanent state comprising an image-fixing assembly having a central chamber, said assembly adapted to receive a normally transparent filmstrip having a saccharin-containing ultraviolet light-sensitive photochromic material coated on one side thereof with a portion of said filmstrip positioned within said central chamber, means for discriminately directing ultraviolet light rays onto the filmstrip to produce temporary opaque images thereon, gas injection means for injecting sulfur dioxide gas into the central chamber to react with the saccharin of the photochromic film and render said portion of the filmstrip opaque, exhaust means to evacuate the gas from the central chamber, and heating means for heating said portion of the film to reverse the reaction of the gas in the unimaged areas of the filmstrip for returning it to a transparent state, with the previous temporary images being rendered permanently opaque.

4. In a real-time display system wherein images temporarily produced on a photochromic film are light projected onto a large size display screen, an apparatus for converting the temporary image to a permanent state as defined in claim 3 wherein the heating means is comprised of means for directing an even flow of hot air over the positioned portion of the photochromic filmstrip, and valve control means for controlling said air flow to heat the film to a temperature of about 70° C. following exposure of the film to the sulfur dioxide gas.

5. In a real-time display system wherein images temporarily produced on a photochromic film are light projected onto a large size display screen, an apparatus for converting the temporary image to a permanent state as defined in claim 3 wherein the heating means is comprised of a heating plate located within the central chamber, and positioning means for positioning the heating plate from a normal retracted position to an operating position with the heating plate located directly over the gas exposed portion of the photochromic film.

6. In a real-time display system wherein images temporarily produced on a photochromic film are light projected onto a large size display screen, an apparatus for converting the temporary image to a permanent state as defined in claim 3 wherein a passageway is provided through the image-fixing assembly to allow the film to be drawn through the central chamber and thereby position a different portion of the filmstrip in the central chamber, an inlet chamber and an outlet chamber provided at either side of the central chamber along the passageway, and said exhaust means including a vacuum connected to the inlet and outlet chambers to exhaust sulfur dioxide gas leaking out of the central chamber and thereby avoid escape of the gas into the surrounding atmosphere.

7. In a real-time display system wherein images temporarily produced on a photochromic film are light projected onto a large size display screen, an apparatus for converting the temporary image to a permanent state as defined in claim 6 wherein the exhaust means includes a first valve control means to produce a vacuum pressure within the inlet and outlet chambers, and said gas injection means includes a second valve control means for injecting a measured volume of gas at a controlled rate into the chamber.

8. In a real-time display system wherein images temporarily produced on a photochromic film are light projected onto a large size display screen, an apparatus for converting the temporary image to a permanent state as defined in claim 6 wherein said means for directing ultraviolet light rays onto the film to produce the temporary opaque image areas comprises a cathode ray tube, said image-fixing assembly having means to position the cathode ray tube with its face plate located along the pathway whereby the photochromic film is drawn across the outer surface of the face plate and in intimate contact therewith, said face plate comprising a fiber optic plate and a phosphor coated on the inner surface of the fiber optic plate that emits ultraviolet light when bombarded by the electron beam of the cathode ray tube, said fiber optic face plat conducting the ultraviolet light emitted from the phosphor through the face plate and onto the photochromic film.

9. In a real-time display system wherein images temporarily produced on a photochromic film are light projected onto a large size display screen, an apparatus for converting the temporary image to a permanent state as defined in claim 8 wherein: the image-fixing assembly has a window portion in the central chamber in alignment with the face plate for transmitting a visible light beam into the chamber and toward the face plate, said face plate having a dichroic filter material coated on the outer surface of the fiber optic plate against which the photochromic film is positioned, and said dichroic filter having the properties of transmitting ultraviolet light and of specularly reflecting visible light.

10. In a real-time display system wherein images temporarily produced on a photochromic film are light projected onto a large size display screen, an apparatus for converting the temporary image to a permanent state as defined in claim 9 wherein a field lens is located in the window portion of the central chamber and including a first light-directing means for directing a visible light beam from a light source through the field lens and onto the face plate of the cathode ray tube where portions of the light beam are blocked by the opaque image areas of the photochromic film, said dichroic filter specularly reflecting the light beam back through the field lens, and a second light-directing means directing the reflected image-bearing light beam into a projection lens for projecting the image onto a large size display screen.

11. An apparatus as defined in claim 9 wherein the image-fixing assembly includes an inlet chamber and an outlet chamber at either side of the central chamber along the passageway, and gas-impeding seals in the passageway of the assembly at the entrance and exit points of the inlet, central and outlet chambers, the seals being adapted to permit free passage of the film while preventing free flow of the gas therethrough said exhaust means including a vacuum means connected with the inlet and outlet chambers creating negative pressures therein to exhaust the gas leaking past the seals and thereby avoid escape of the gas into the surrounding atmosphere.